Figure 1:
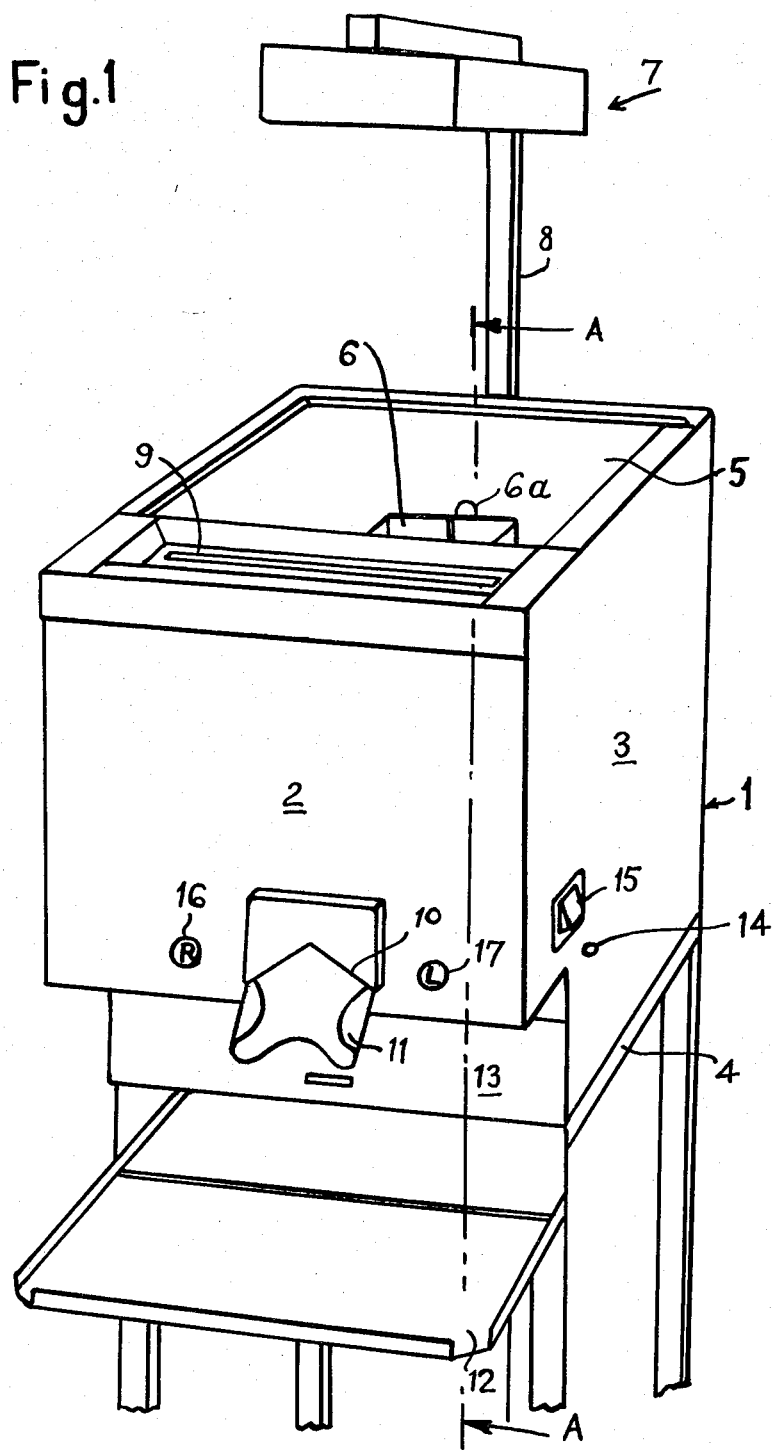

United States Patent [19]

Faulkner et al.

[11] 4,402,426
[45] Sep. 6, 1983

[54] WEIGHING AND DISPENSING UNIT

[75] Inventors: Keith Faulkner, Bexley; David E. Appleford, Romford, both of England

[73] Assignee: Portionmat (Engineering) Limited, England

[21] Appl. No.: 184,166

[22] Filed: Sep. 4, 1980

[30] Foreign Application Priority Data

Sep. 4, 1979 [GB] United Kingdom ................ 7930641
Dec. 11, 1979 [GB] United Kingdom ................ 7942672

[51] Int. Cl.³ ........................................... G01G 13/28
[52] U.S. Cl. ..................................... 222/56; 222/77; 177/113
[58] Field of Search ............... 222/55, 56, 77; 177/59, 177/112, 113, 48

[56] References Cited

U.S. PATENT DOCUMENTS

| | | | |
|---|---|---|---|
| 1,103,469 | 7/1914 | Ball | 177/113 |
| 1,152,868 | 9/1915 | Zanone | 177/113 |
| 2,022,659 | 12/1935 | Fisher et al. | 177/113 X |
| 2,726,061 | 12/1955 | Schieser et al. | 177/48 |
| 3,094,181 | 6/1963 | Kershaw | 222/56 X |
| 3,498,395 | 3/1970 | Henry | 222/56 X |
| 4,095,723 | 6/1978 | Lerner | 222/56 |
| 4,171,067 | 10/1979 | Faulkner et al. | 222/56 X |
| 4,247,019 | 1/1981 | Lerner | 222/77 X |
| 4,312,462 | 1/1982 | Faulkner et al. | 222/77 X |
| 4,326,645 | 4/1982 | Faulkner et al. | 222/77 X |

Primary Examiner—Robert B. Reeves
Assistant Examiner—Edward M. Wacyra
Attorney, Agent, or Firm—Roylance, Abrams, Berdo & Farley

[57] ABSTRACT

Food is fed onto a weighing platform inside a dispensing chamber and carried by a parallelogram weighing support disposed outside the dispensing chamber and supported by four parallelogram arms from an upright frame, the platform being retained in a position to receive the food by a releasable electrically operated latch. When a weigh beam detects a weight set by a control circuit, it sends an electrical signal to the control circuit which causes feed to stop and provides a condition in which an electrical signal can be sent to the latch to release the weighing platform into a position in which a weighed portion of food can be discharged therefrom. In one embodiment, at least one switch is manually operated from outside the unit to cause the control circuit to apply the releasing signal to the latch either immediately or after an interval of time.

30 Claims, 15 Drawing Figures

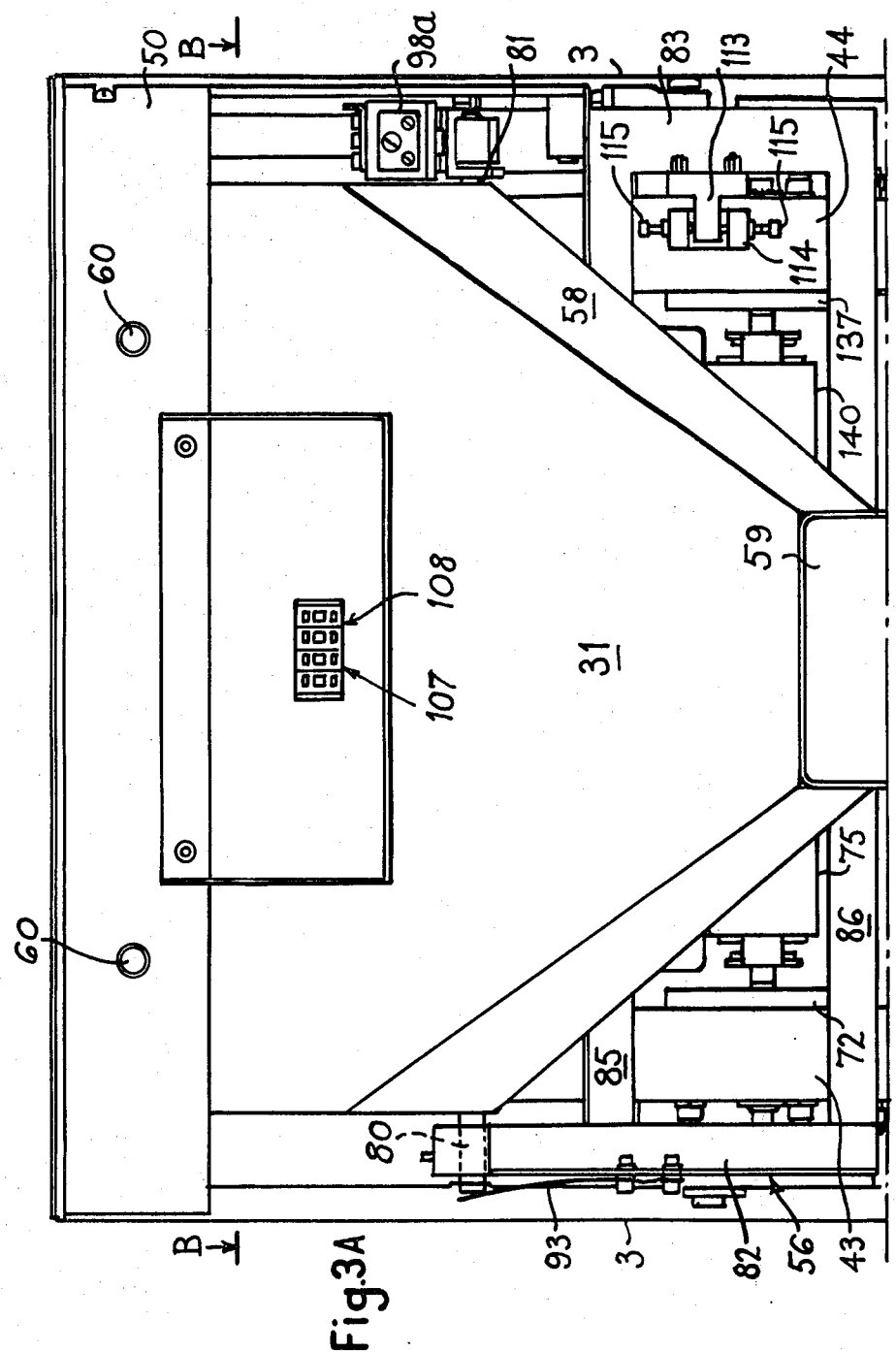

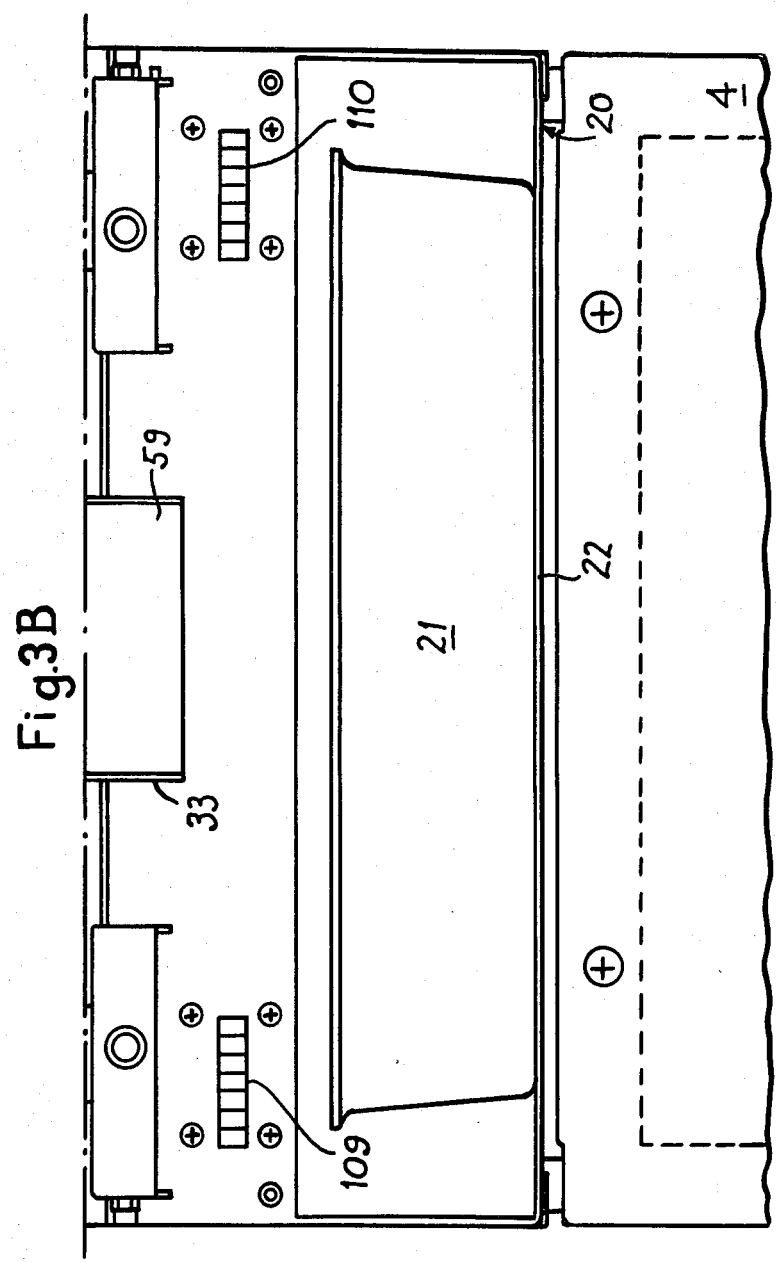

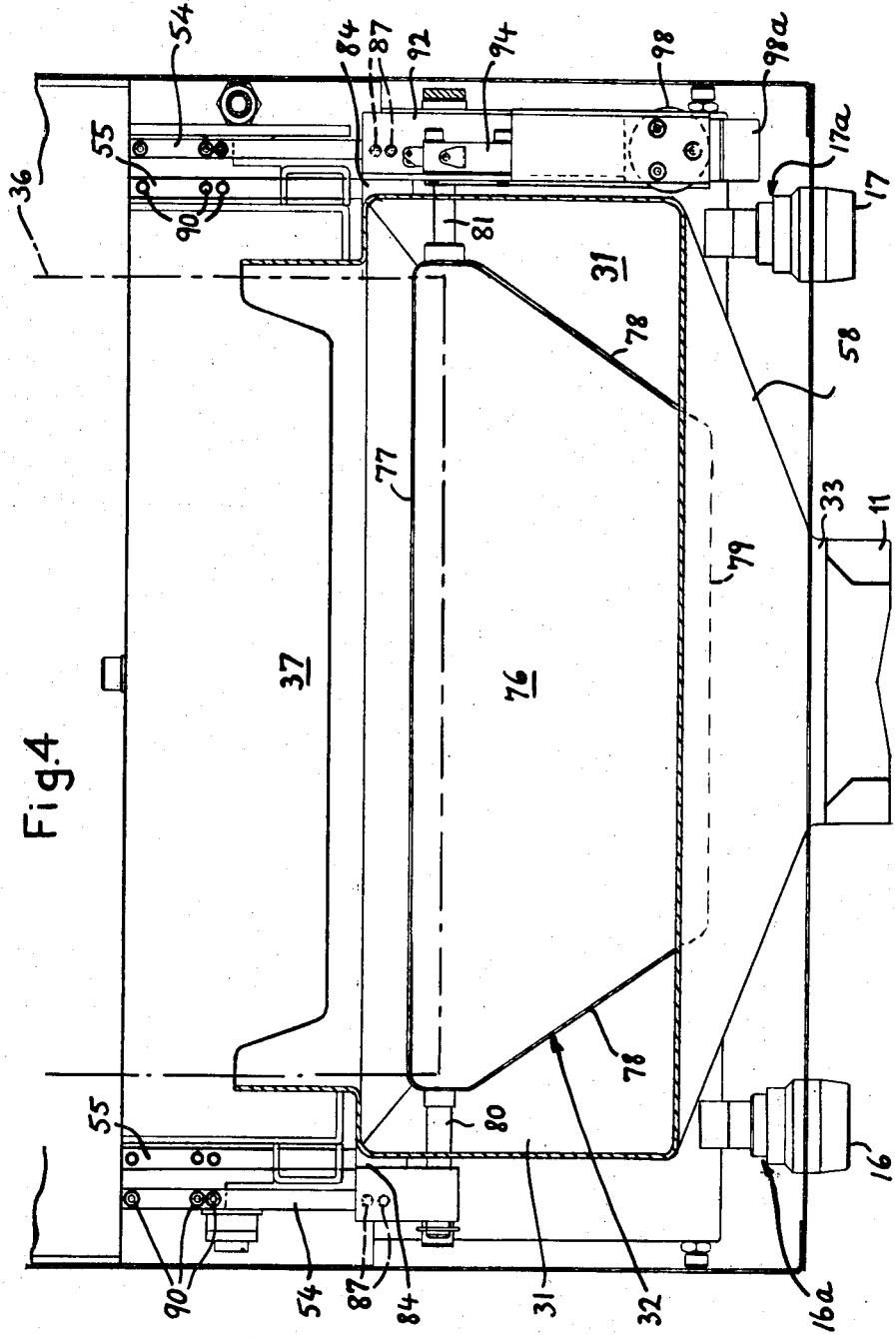

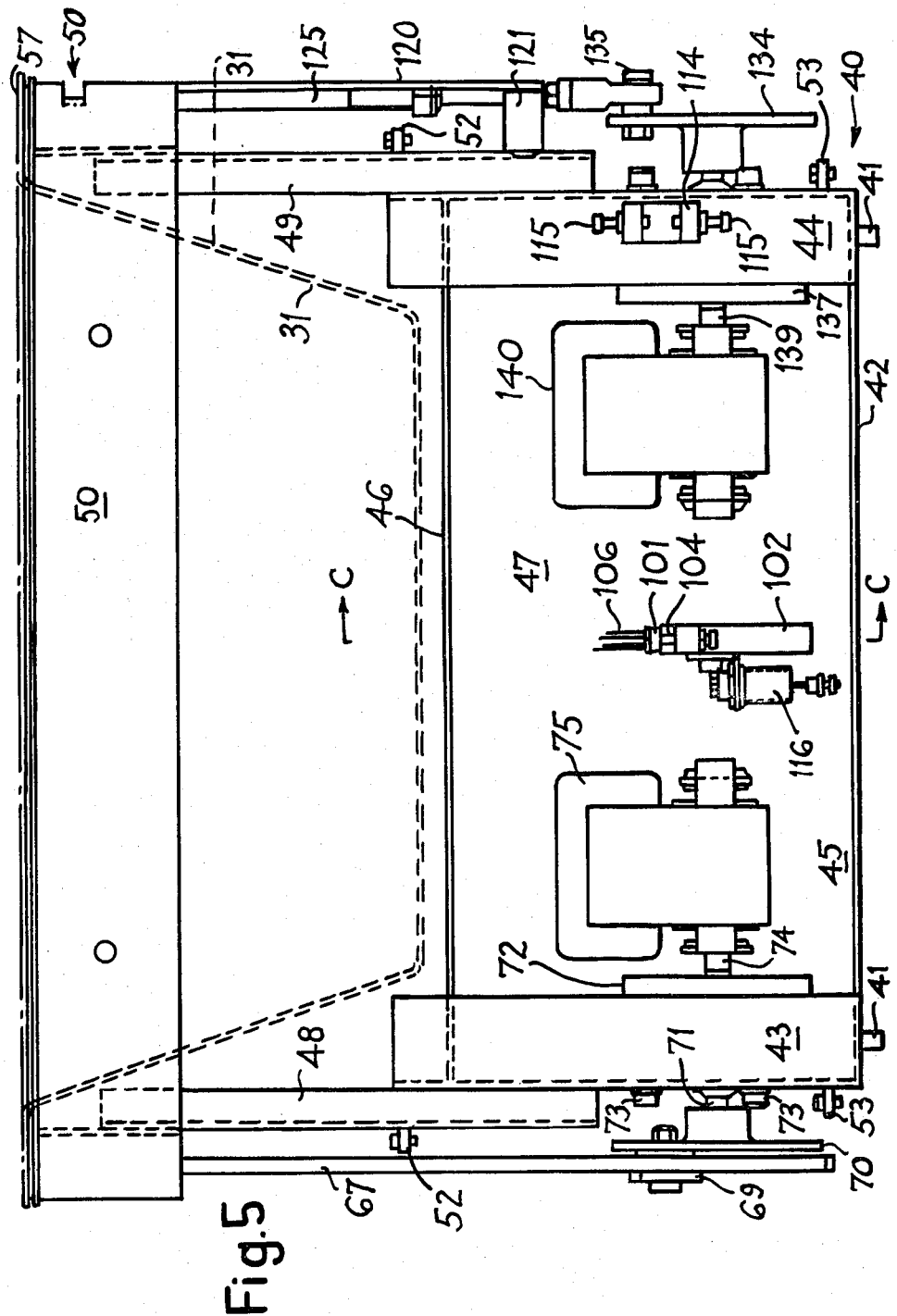

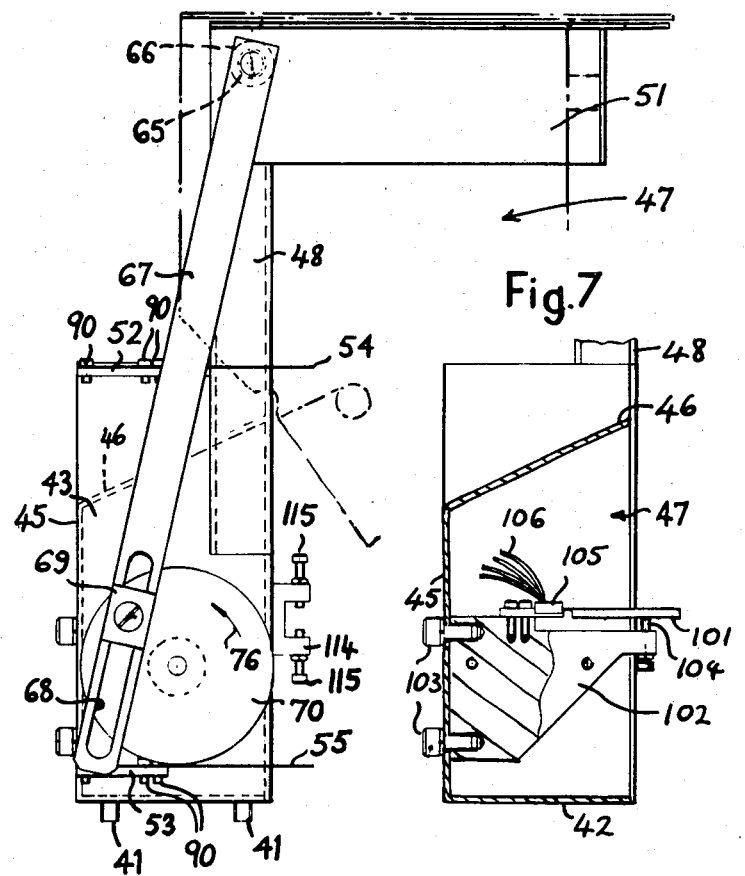

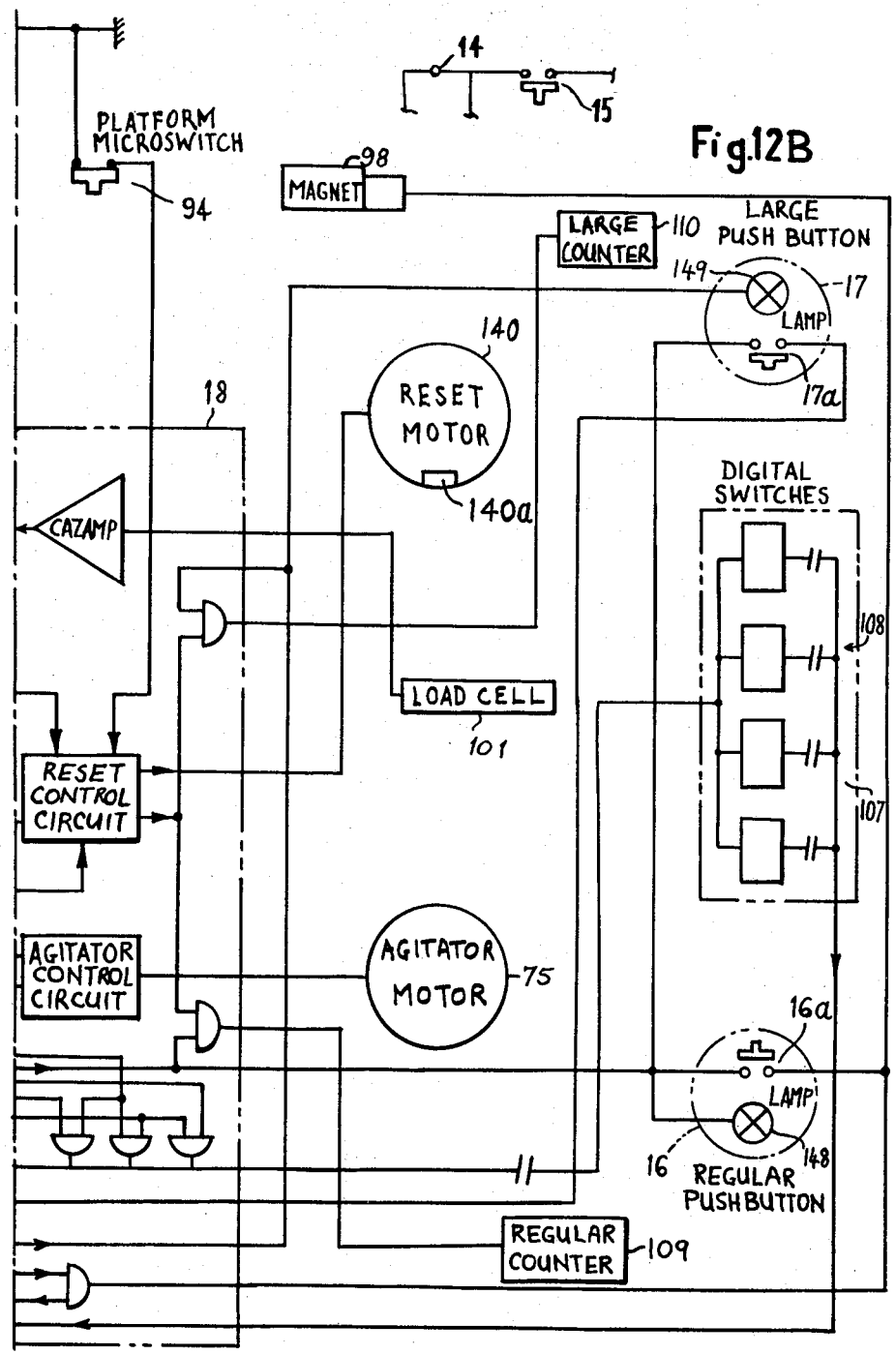

WEIGHING AND DISPENSING UNIT

This invention relates to a weighing and dispensing unit, primarily for flowable solid food, such as cooked potato products, in particular chips/french fries.

In the specification of our U.S. Pat. No. 4,171,067 there is disclosed a unit for weighing and dispensing portions of cooked potato products, comprising a receptacle for receiving a supply of the products, and a dispensing chamber opening into the receptacle and into which the products are fed by a vibrator unit coupled to the receptacle, and a weighing means including a weighing platform disposed inside the dispensing chamber and hinged to a movable weighing support disposed outside the dispensing chamber, the weighing platform being retained in one position to receive the food and being releasable to hinge downwardly to discharge a weighed portion of food therefrom in response to the weighing means detecting a predetermined weight of potato products on the weighing platform.

An object of the present invention is to provide an improved weighing and dispensing unit which has one or more of the following characteristics namely, in which it is possible to dispense through the front, which is capable of even greater accuracy and faster service which is simple to assemble and which is capable of being operated merely by the actuation of switches.

The present invention consists in a unit for weighing and dispensing portions of flowable solid food of predetermined weight, in which food is fed into a dispensing chamber and onto a weighing platform supported by a weighing support, characterised by means for sensing a predetermined weight of food on said platform, releasable means for retaining the platform in a position to receive the food and a control circuit for setting the predetermined weight and being operable by a signal from said sensing means to provide a condition in which feed is stopped and the retaining means can release the platform to permit it to move into a position in which the weighed portion of food can be discharged therefrom.

By virtue of the sensing means, the retaining means and the control circuit, there need only be a very small amount of weighing movement, and the apparatus can be more simply constructed and easier to operate. Moreover, the control circuit can be arranged to stop feed, prior to or immediately after the sensing means detects a predetermined weight of food on the platform, after which the platform is released. Alternatively the platform can be held in the food receiving position by the retaining means until a further switching operation is performed by the operator to release the weighing platform. When the feed is stopped at a percentage of the predetermined weight, than the further switching operation will restart the feed until the sensing means detects the predetermined weight whereupon the control circuit will allow the retaining means to release the platform.

Furthermore, by the use of a control circuit, an infinitely variable number of predetermined weights can be selected. The selection of predetermined weight can be obtained by the use of digital or analogue methods.

The sensing means may be of any suitable kind and disposed relative to the weighing support in any convenient manner which will be apparent to those skilled in the art. For example, the sensing means may be a strain gauge incorporated in a cantilvered beam from which the weighing support is suspended or, alternatively, the sensing means may be a load cell.

The retaining means is conveniently an electromagnetic latch which is momentarily denergized by a signal from the control circuit to release the weighing platform.

Preferably, the weighing platform is hinged to the weighing support and is releasable to hinge downwardly to discharge a weighed portion of food therefrom. The weighing support is preferably a parallelogram weighing support.

In a preferred embodiment of the invention, the control circuit includes switching means, conveniently with an associated indicating light or lights and means for holding-in the retaining means until the switching means is operated. In such an embodiment, the switching means may be operated by at least one push or touch button operated from the outside of the unit and the control circuit is arranged such that when the sensing means detects the predetermined weight of food on the platform, feed to the dispensing chamber is immediately stopped and the weighing platform is not released until the switching means is operated. Conveniently, the switching means includes at least one other switch, operated e.g. by a push or touch button with an associated indicator light or lights for at least one heavier weight, in which case, operation of the or any one such switch will restart feed of the food onto the weighing platform until the heavier weight has been detected by the sensing means, at which point, the control circuit will allow the retaining means to release the weighing platform. After release of the weighing platform, the weighing platform is preferably automatically reset to its food receiving position in order to ensure that each vending cycle succeeds the previous vending cycle in a smooth and reliable fashion without any intervention by the operator. In a preferred embodiment, provision is made for allowing the reset means to continue to operate should the weighing platform be jammed, e.g. by a hard piece of food, short of its food receiving position until the jam is cleared.

Figure 2A:
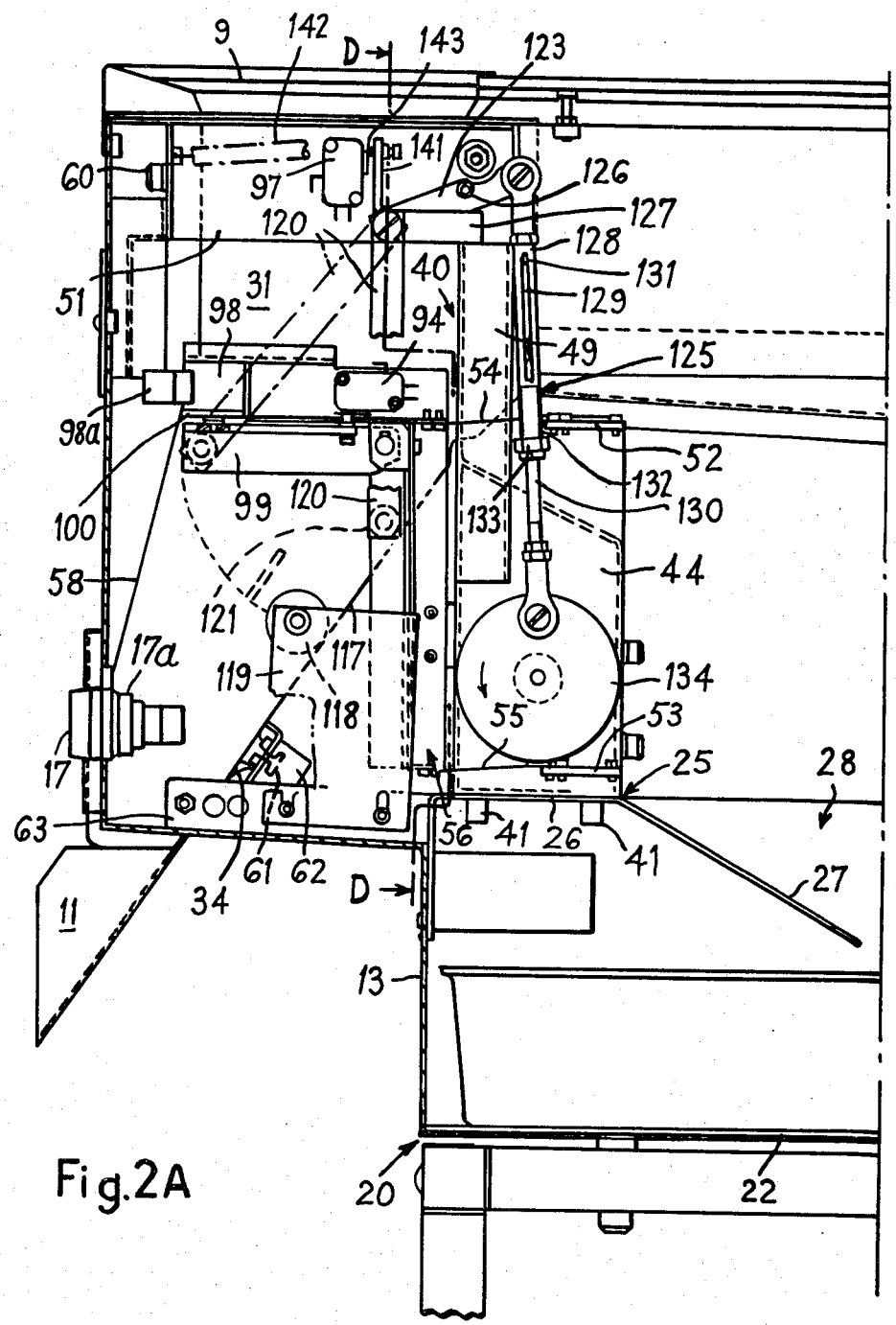
Figure 2B:
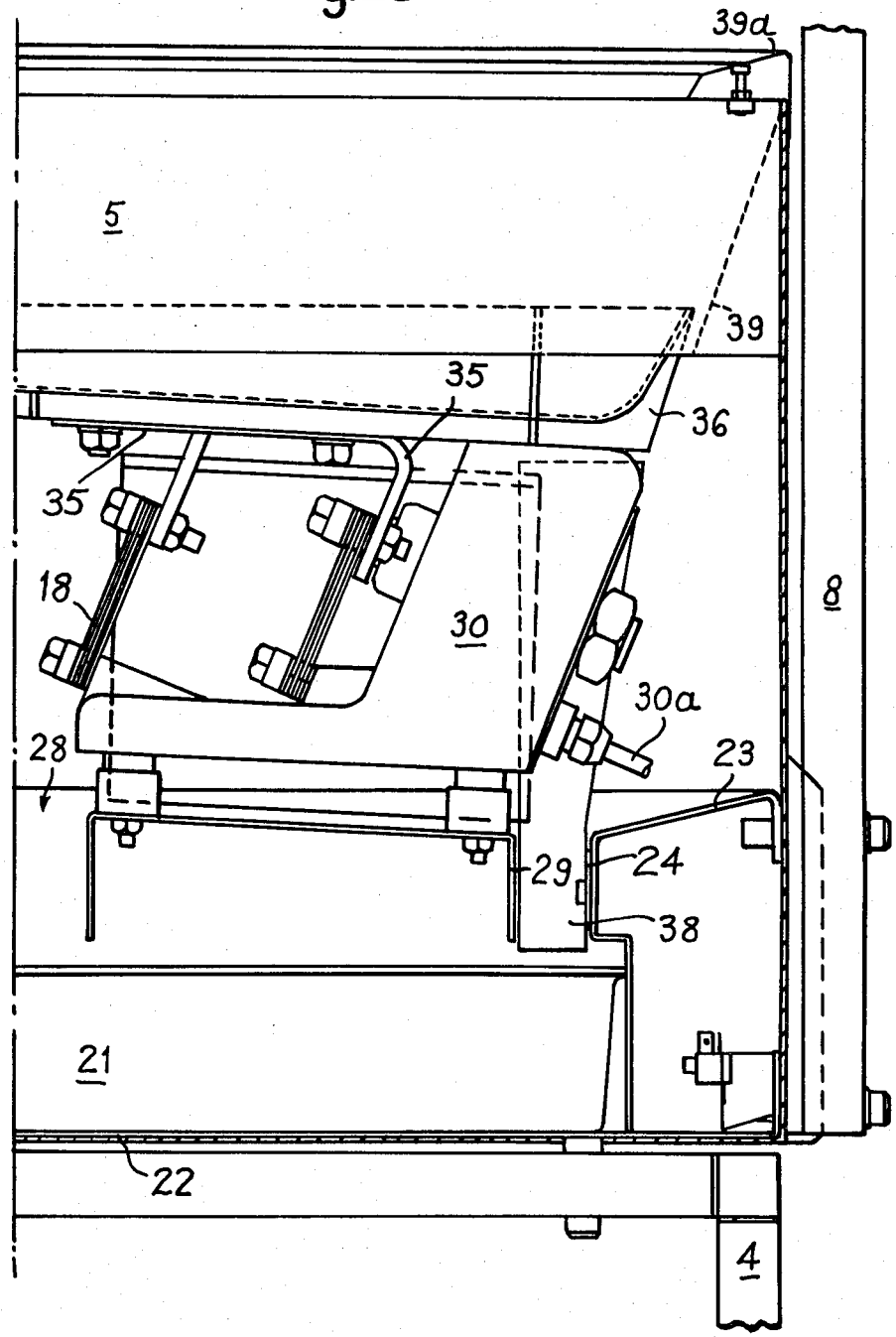
Figure 8:
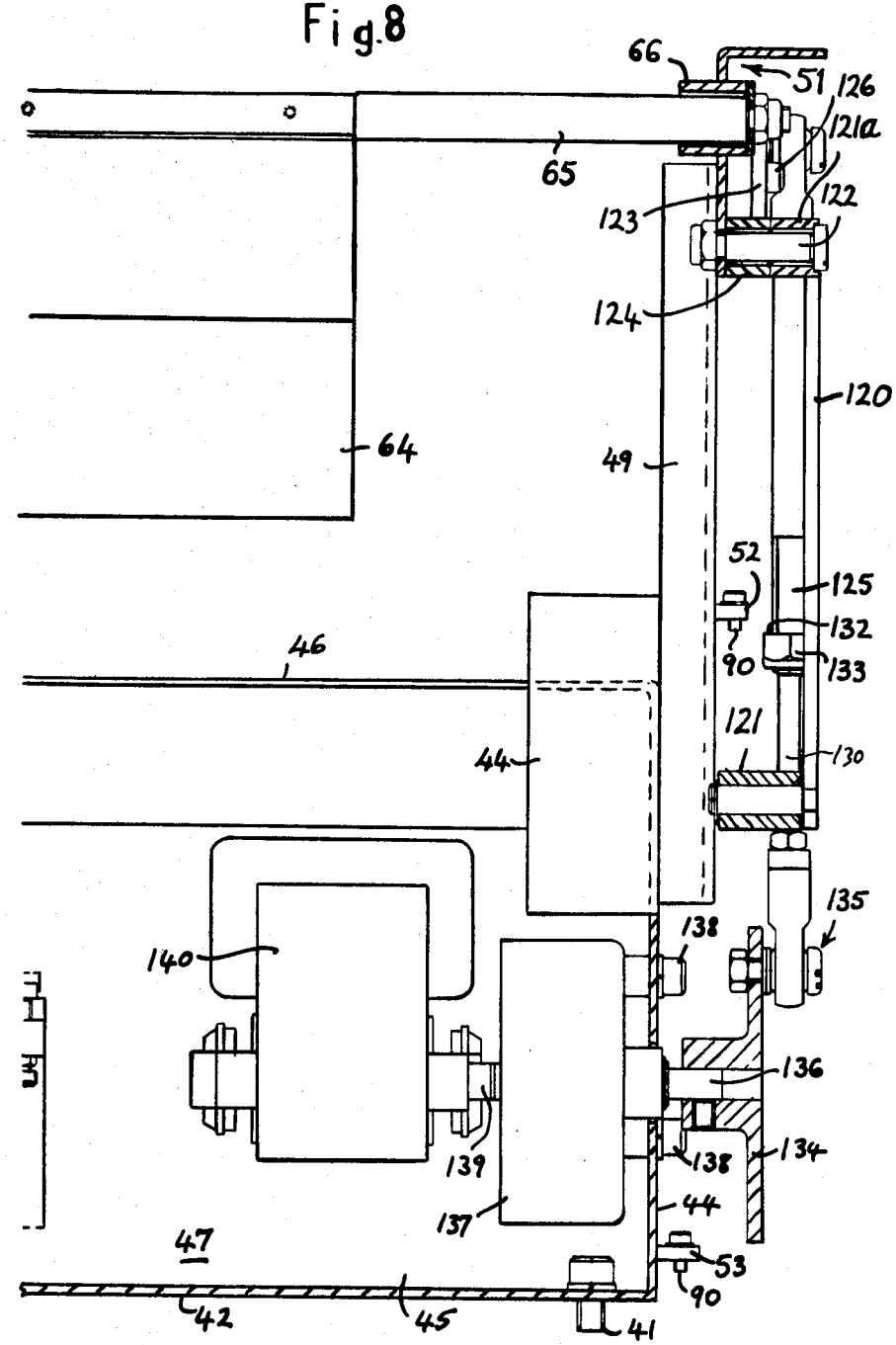
Figure 9:
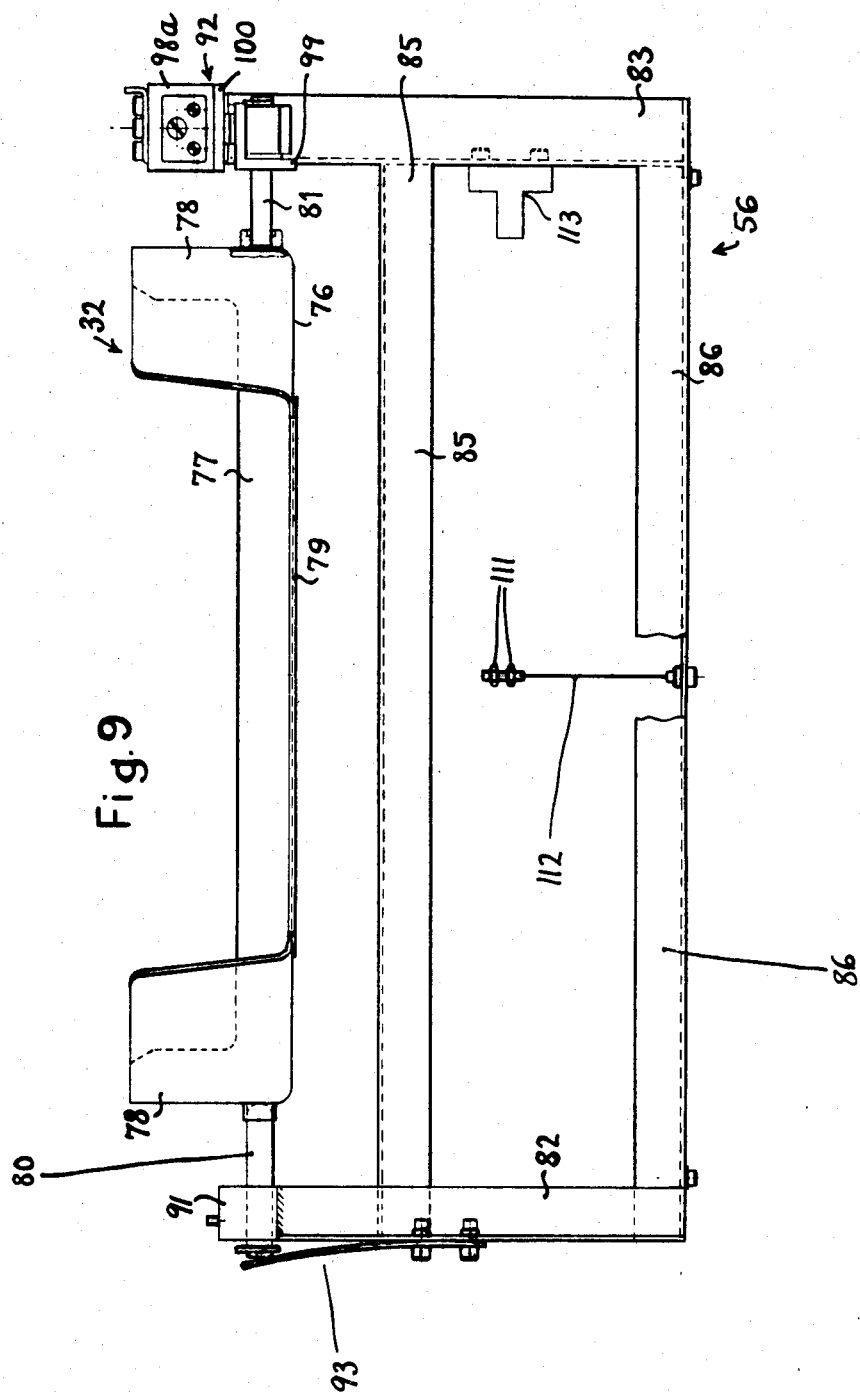
Figure 10:
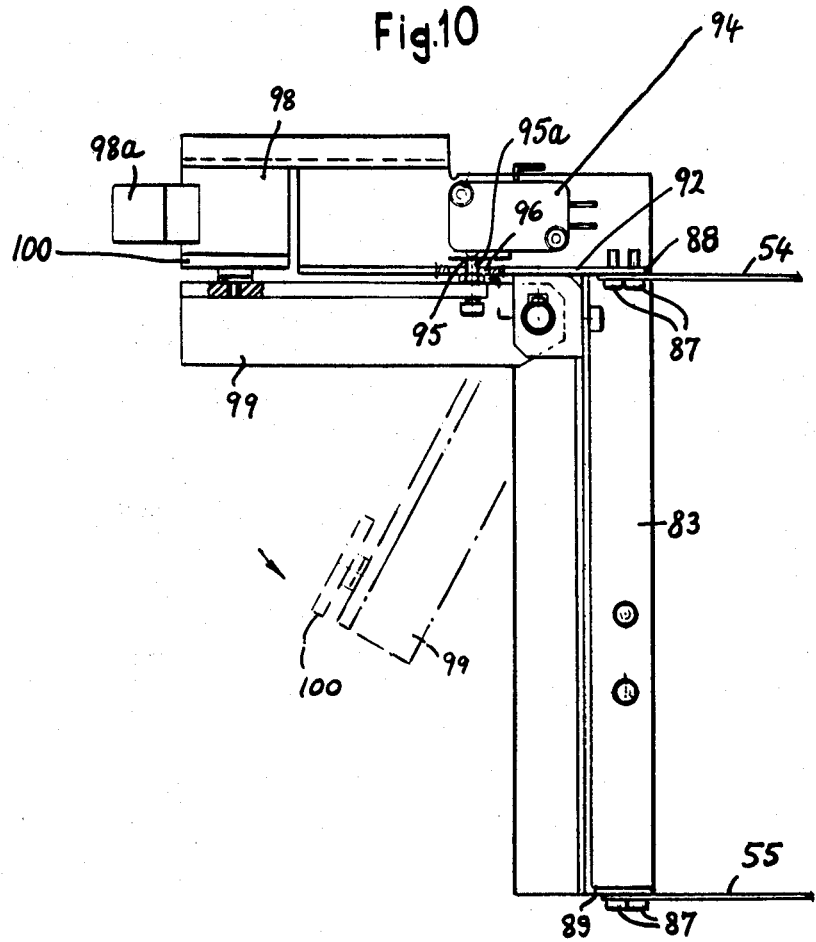
Figure 11:
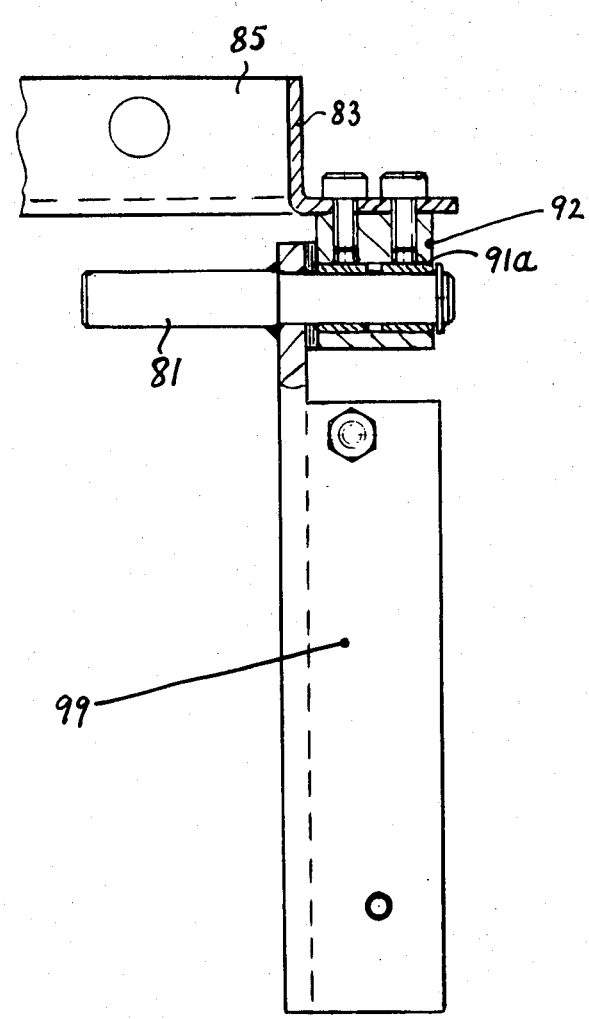
Figure 12A:
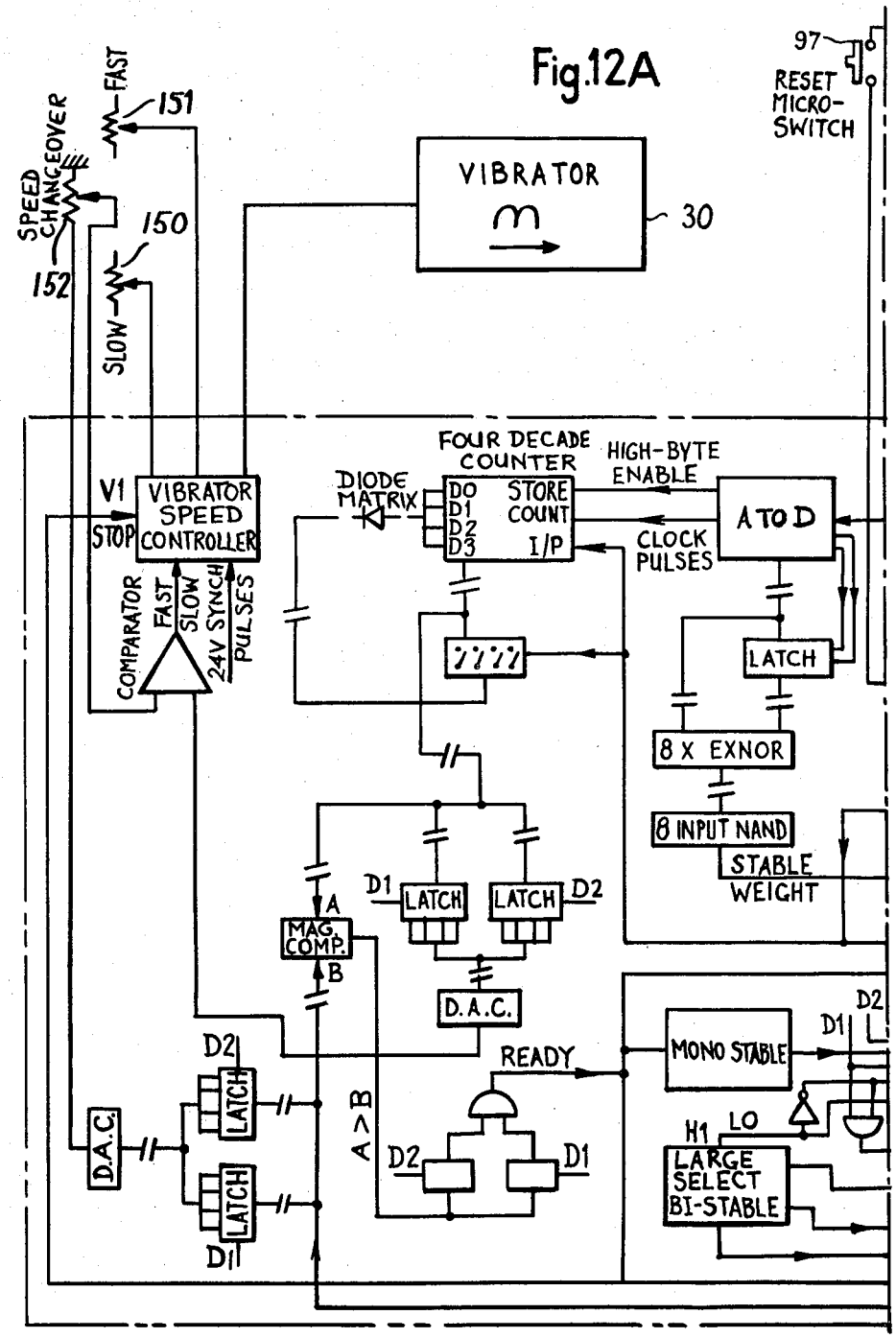

In order that the invention may be more fully understood, reference will now be made to the accompanying drawings, in which:

FIG. 1 is a front perspective view of a unit for weighing and dispensing portions of flowable cooked food, such as potato chips/french fires or meat strips, etc. and incorporating the present invention, FIGS. 2A and 2B together constitute a longitudinal section taken along the line A-A of FIG. 1, FIGS. 3A and 3B together constitute a front end elevation of the unit of FIG. 1, with the front panel removed, FIG. 4 is a cross-section taken along the line B-B of FIG. 3, FIG. 5 is a front end elevation, with parts removed, FIG. 6 is a left-hand side elevation of FIG. 5, FIG. 7 is a cross-section taken along the line C-C of FIG. 5, FIG. 8 is a cross-section taken along the line D-D of FIG. 2 and looking in the direction of the arrows FIG. 9 is a front end view of a parallelogram weighing support forming part of the weighing and dispensing unit of FIG. 1, FIG. 10 is a right-hand end view, as illustrated, of FIG. 9, FIG. 11 is a plan view of FIG. 10, to a larger scale, and, FIGS. 12A and 12B are block diagrams of one form of control circuit for the unit of FIG. 1.

The weighing and dispensing unit shown in FIG. 1, comprises a casing 1 within which are disposed a weighing means and a dispensing chamber to be described. The casing includes a front panel 2, side panels 3 (only one shown) and a rear panel (also not shown) secured to a supporting base member (not visible) which rests on a supporting table 4. An open-topped receptacle 5 for receiving a supply of food is supported in the open top of the casing 1 and a motor-driven agitator 6, having a rear wheel 6a, is disposed in the receptacle, for facilitating separation of any stuck-together bodies of food. Optionally, an electrical heating device 7 may be provided, as shown, if it is necessary to maintain the food hot whilst in the receptacle and dispensing chamber. The heating device 7 is supported over the open top of the receptacle by means of an upright 8 which is secured to the rear panel. Heat from the heating unit also passes through a removable grill 9 into the dispensing chamber which opens into the receptacle 5 and terminates in an outlet portion which projects through an opening 10 in the front panel 2. A spout 11 is removably secured in the opening 10 above a tray 12 mounted on the table 4 and is specially shaped as shown as to aid flow of each weighed portion of food being dispensed onto a plate or into a container placed there beneath and, if desired be received in the opening of a paper or cardboard container placed over the spout. There is an opening in the base member beneath the front panel 2 which is closed by a hinged flap 13 which can be opened to remove a drainage drawer (not shown) for receiving hot frying oil or fat drained from the receptacle.

On the right-hand (as shown) side panel 3 there is a mains indicating light 14 and a two position master operating switch 15 which is connected to the electronic control circuit 18 shown in FIG. 12 and which lights up when the unit is plugged in, in one of its positions, and when switched to its other position initiates the start of a vending cycle comprising weighing and dispensing operations to be described. Two push buttons 16, 17 are mounted on the front panel and operate respective switches connected to the control circuit for a lighter and heavier weight, and have indicating lights which light up to indicate when the unit is ready to dispense a light or heavy weighed portion of food by pressing of the appropriate push button 16 or 17 as the case may be.

Referring now to FIGS. 2 to 4, the base frame member of the unit is generally indicated at 20 and is of generally rectangular box-like configuration with its various metal parts being made rigid with one another, as by welding for example, to form a rigid integral supporting structure. The base member has an opening at its front end closed by the hinged flap 13 to receive the drainage drawer 21 which rests on the bottom wall 22 of the base member. At its top side the base member has a sloping rear portion 23 leading into a transverse rear channel 24 in communication with the space above the drainage drawer 21, a front portion 25 having a flat surface 26, and a sloping surface 27 leading into a front transverse channel 28. The inner ends of the channels 24 and 28 are defined by an intermediate transversely extending portion 29 supporting a vibrator unit 30 for feeding food from the receptacle 5, into the dispensing chamber 31 and onto a weighing platform 32 disposed therein. The vibration unit 30 is connected by a lead 30a to the electronic control circuit 18 and has its coupling member 35 secured to and supporting a vibration tray 36 forming the bottom wall of the receptacle 5. The vibration tray 36 is inclined upwardly in the direction towards the opening 37 of the dispensing chamber 31 to allow hot frying oil or fat to drain away in the opposite direction, through a spout (not shown) depending from the vibration tray and through a chute 38 which projects through the rear channel 28. The sloping surface 27 and rear portion 23 allow any food bits or oil or fat which may have found their way into the space above the base frame member to pass through the channels and enter the drainage drawer. As shown in chain lines in FIG. 4, the vibration tray extends through the chamber opening 37 and projects over the weighing platform 32. The vibration tray 36 is separate from the rear wall 39 and side walls of the receptacle which are supported by an integral rim 39a from the casing panels. The spout 11 is removable and extends through a slot left between the outlet portion 33 of the dispensing chamber and is held in position by a spring 34. The unit also comprises an upright frame member 40 which is rigidly secured to the flat surface 26 of the front portion 25 of the base member 20 by means of screws 41 and which supports all the remaining operating components, including the weighing platform, weighing support and dispensing chamber 31 as will be apparent hereinafter. Again, all the various metal parts of the upright frame member 40 are rigidly secured to each other, as by welding, to form a rigid integral supporting structure. The base and upright frame members 20, 40 provide for a simple construction which considerably facilitates assembly, thereby reducing manufacturing costs.

Referring more particularly to FIG. 5, the upright frame member 40 is symmetrical about the longitudinal axis of the base member 20 and comprises a base plate 42, lower side elements 43, 44, a back plate 45 and inclined intermediate plate 46 (FIGS. 6 and 7) which both extend between the lower side elements and define therewith an open-fronted housing 47. Upper side elements 48, 49 which are narrower than the lower side elements 43, 44 and are rigid with their outer sides, carry a generally U-shaped in plan element 50 of which the arms 51 of the U are rigid with the upper ends of, and cantilevered from, the upper side elements. As will be appreciated from FIGS. 5 and 6, the various elements of the upright frame member 40 are generally of right-angled cross-section which provides for strength and ease of manufacture. The inclined intermediate plate 46 forms the roof of the open-fronted housing 47.

Each of the lower side elements 43 and 44 carries two, respective upper and lower, supporting brackets 52, 53 for the upper and lower arms 54, 55 respectively of a parallelogram weighing support 56 to be described. The top surface of the U-shaped cantilevered element is flat and the dispensing chamber has a lip 57 (shown in chain lines in FIG. 5) along its upper edge which engages over the flat surface so as to support the dispensing chamber 31 thereon. Beneath the weighing platform 32, the walls of the dispensing chamber converge (see FIG. 3) to form a funnel 58 which is angled outwardly in the direction of the front panel as shown in FIG. 2 and which terminates in the outlet portion 33 defining an outlet 59. The dispensing chamber is secured in position near its upper end by screws 60 (one shown only) and near its lower end by a screw 61 to a bracket 62 mounted on a support 63 projecting from the front end of the base member 20.

The agitator 6 is in the form of an open frame having its wheel 6a engaging with the sloping rear wall 39 of the food receptacle 5 and at its front end is removably connected to a levelling plate 64 (See FIG. 8) which is rigid with a spindle 65 extending between, and supported in bearings 66 in the vertical portions (FIGS. 6 and 8) of the arms 51 of the U of the cantilever element 50.

Referring to FIGS. 5 and 6 one end of the spindle 65 projects out of its bearing 66 where it is fixed to the upper end of an arm 67 having a slot 68 in its lower end. A bearing 69 in the slot 68 is pinned eccentrically to a disc 70 which is fast for rotation with the output shaft 71 of a reduction gear box 72 mounted on the lower side element 43 within the housing 47 by screws 73 and connected to the output shaft 74 of an electric motor 75 which is also mounted in the housing 47 and which is connected to the control circuit 18 of FIG. 12. Operation of the motor 75 causes rotation of the disc 70 in the direction of the arrow 76 (FIG. 6) so that the bearing 69 moves up and down in the slot 68 causing the arm 67 to pivot backwards and forwards and turn the spindle 65 in opposite directions, imparting a backwards and forwards pivotal movement to the levelling plate 64 and a composite backwards and forwards and upwards and downwards movement to the agitator frame, (the latter being caused by the wheel 6a riding up and down the sloping rear wall 39 of the receptacle). The levelling plate 64 levels out the chips as they are fed by the vibrator 30 towards the dispensing chamber 31 so that the food is fed more or less in a single layer into the dispensing chamber and onto the weighing platform 32.

Referring now to FIGS. 9 to 11, the weighing platform 32 has a bottom wall 76, inclined rear wall 77 disposed adjacent the opening 37 (FIG. 4) to the dispensing chamber beneath the projecting edge of the vibrator tray and side walls 78 of greater height than that of the rear wall and converging inwardly towards the front edge 79 of the platform, to form in effect a discharge aperture between the front ends of the side walls. Two hinge pins 80, 81 are rigidly fixed to the platform side walls 78 adjacent to the rear wall 77 and extend through holes (not shown) in the side walls of the dispensing chamber 31 to be supported on the parallelogram weighing support 56 which is disposed outside the dispensing chamber 31.

The parallelogram weighing support 56 is in the form of a weighing frame of generally rectangular configuration and comprises two side members 82, 83 interconnected by intermediate and lower members 85 and 86, all preferably of right angle cross-section pieces of metal rigidly secured together as by welding with members 85 and 86 being disposed in the space between the rear wall 117 of the dispensing chamber 31 and the front of housing 47 and with the upper end portions of side members 82, 83 passing on opposite sides respectively of the side walls of the dispensing chamber (See FIGS. 2 and 3). The parallelogram arms 54, 55 of the weighing frame are constituted by four springy metal strips which are secured by two screws 87 respectively to the undersurfaces of respective support brackets 88, 89 rigid with the two side members 82, 83 of the weigh frame at and near the upper and lower ends thereof. The parallelogram arms 54, 55 pass on opposite sides respectively of the side walls of the dispensing chamber 31 and are secured each by three screws 90 (FIGS. 2 and 4) to the upper surfaces of the support brackets 52, 53 on the lower side elements of the upright frame member. It will be seen from FIG. 4 that the support surfaces of the brackets for the parallelogram arms 54, 55 extend for about one third of the length thereof to provide an adequate bearing surface for these arms. The parallelogram arms 54, 55 support the majority of the weight of the weighing frame 56.

Extending forwardly from the upper end of left-hand side member 82 of the weighing frame is a bearing support 91 for the left-hand hinge pin 80 of the weighing platform. An arm 92 extends forwardly from the upper end of side member 83 and at its rear end forms a support for a bearing 91a for the right-hand hinge pin 81 of the weighing platform. The outer end of the left-hand end hinge pin engages with resilient means in the form of a springy metal strip 93 secured to the side member 82 of the weighing frame. The spring 93 enables the weighing platform to be removed from the bearings in the weighing frame, for cleaning, by pressing outwardly against the pressure exerted by the spring and the supported length of the parallelogram arms 54, 55 on the brackets 52, 53 retains the weigh frame 56 in position, ensuring that the arms are not strained.

The arm 92 carries a microswitch 94 for sending a platform position signal to the control circuit 18, when the microswitch and another microswitch 97 in series therewith are both open. The switching member 95 of the microswitch 94 is disposed above an aperture 96 in the arm 92, and the arm 92 also carries an electromagnet 98 forming one part of a magnetic latch, and connected by a connector 98a and leads (not shown) to the control circuit 18.

An arm 99 for use in latching and resetting the weighing platform 32 is fixed rigidly to the hinge pin 81 so as to be movable with the weighing platform. The platform arm carries a plate 100 of a magnetic material which co-operates with the electromagnet 98 and forms the other part of the magnetic latch which when energized holds the arm and thus retains the weighing platform 32 in its substantially horizontal food receiving position. Near its inner end, the platform arm carries an actuating member 95a formed by a screw held by a locknut which projects through the aperture 96 in the arm 92 of the weighframe and pushes the switching member 95 to open the microswitch 94 only when the arm 99 and thus the platform is latched in the food receiving position as shown in FIG. 10.

As can be seen from FIGS. 5, 7, a weigh beam 101 is cantilevered from a support bracket 102 secured to the backplate of the upright frame member by screws 103 at a location which coincides with the longitudinal axis of the base frame member 20. Beneath the weigh beam, an adjustable end stop 104 comprising a screw and a locknut for preventing overloading of the weigh beam is secured to the support bracket 102. The weigh beam 101 incorporates a strain gauge as a means for sensing a predetermined weight of food on the weighing platform and is preferably of the kind sold under the trade mark SALTER which incorporates a thin-film strain gauge as the sensing means. The strain gauge has a connector 105 connecting it by leads 106 to the control circuit 18. The control circuit 18 incorporates means for setting the two predetermined weights representing the light and heavy weights, e.g. of 3 and 5 ounces respectively, including two pairs of digital switches 107 and 108 mounted from the base of the U of the cantilever element 51 of the upright frame member 40, behind the front panel 2 as can be seen in FIG. 3. Moreover, there are two counters 109 and 110 connected to the respective push button operated switches 16a and 17a and to the control circuit 18 for recording separately the numbers of light and heavy portions of food dispensed after the related push button 16 and 17 is depressed. At its outer end, the weigh beam 101 is adjustably connected by nuts 111 to the upper end of a suspension wire 112 whose lower end is secured to the centre of the lower member 86 of the weigh frame 56, to support the remainder of the weight of the weigh frame 56, as shown in FIG. 9.

A T-shaped member 113 is secured by screws to the side member 83 of the weigh frame 56 with its leg projecting between the arms of a U-shaped member 114 secured to the side element 44 of the upright frame member 40. Each arm of the U-shape member carries an adjustable screw 115 which can be held in the appropriate position by a respective locknut. The bottom adjustable screw acts as an end stop and is set at a slightly lesser distance from the bottom of the leg of the T-shaped member than that between the weigh beam 101 and the end stop 104. With the weigh frame supported on the arms 54, 55, the position of the top screw is adjusted until it just touches the upper surface of the leg of the T-shaped member and is then released slightly so it does not actually touch to prevent upward movement when the reset mechanism to be described is operated. The locknut associated with the top screw is then tightened and the bottom screw is adjusted to the appropriate distance and its locknut is then tightened. This means that, generally, the T-shaped member will abut the bottom screw prior to the weigh beam abutting the end stop in the event of overloading of the weighing frame.

In certain constructions, if there should be any undesirable oscillations of the weighing frame 56, then as shown in FIG. 5, a friction free damping means may be provided in the form of an air damping dashpot 116 which is connected between the support bracket 102 and the base member 86 of the weighing frame 56 and may be of the type sold under the trade mark AIRPOT.

In order to prevent the weighing platform 32 striking the rear wall 117 of the dispensing chamber 31 when the magnetic latch is released, preferably an end stop 118 of a resilient material is mounted on a bracket 119 secured to the support 63 to be engaged by the platform arm 99 and thus stop the platform 32 short of the rear wall 117.

The weighing platform is re-set to its substantially horizontal food receiving position automatically, after discharge of a weighed portion of food and after the platform arm engages the end stop if provided. To this end the unit includes an automatic re-set mechanism comprising a re-set lever 120 carrying a roller 121 at its free lower end which engages with the under surface of the platform arm 99 in the released position of the platform. As will be more clearly apparent from FIG. 8, the upper end of the re-set lever 120 is fixed to the out part 121a of a two part bearing sleeve mounted on a pivot pin 122 fixed at its inner end to the vertical part of the right-hand arm 51 of the cantilever element 50. A link arm 123 is fixed to the inner part 124 of the bearing sleeve and is inclined upwardly in the rearwards direction at an angle with respect to the re-set lever 120. The upper end of the link arm 123 is pivoted to the upper end of an elongatable connecting member constituted by a telescopic arm 125 and intermediate its ends has a boss 126 projecting above and spaced from an arm 127 fixed to the upper end of the reset lever at an angle of 90° thereto. The link arm 123, sleeve part 124, boss 126 and fixed arm 127 constitute a lost motion device. The telescopic arm comprises an upper tubular part 128 having two diametrically opposed slots 129 (only one shown) therein and a lower rod-part 130 which engages in the tubular part and has a pair of diametrically opposed lugs 131 (only one shown) engaging in the respective slots. A compression spring 132 encircles the tubular and rod parts and engages at its upper end on the lugs 131 and at its lower against a retaining nut 133. The lower end of the telescopic arm 125 is connected eccentrically to a drive disc 134 by means of a screw/locknut/washer assembley 135. The disc 134 is fast for rotation with the output shaft 136 of a reduction gearbox 137 which is mounted inside the housing 47 on the side element 44 of the upright frame member 40 by means of screws 138. The reduction gearbox output shaft is connected to the output shaft 139, either directly or through a clutch, of an electric motor 140 mounted within the housing 47 and which is connected to the control circuit 18. The electric motor has a brake 140a (FIG. 12B) which is operated when the motor is switched off by the control circuit.

As shown in FIG. 2, at its upper end, the reset lever 120 is extended by an arm 141 which is rigidly fixed thereto and which is connected to a tension spring 142 fixed at its other end to the other arm 51 of the U-shaped cantilever element 50. The pressure exerted by the spring is in the direction to cause a switch actuating member 143 on the extension arm 141 to maintain the reset microswitch 97 open when the reset lever occupies the substantially vertical full-line position illustrated in which the weighing platform is latched to receive food. The reset microswitch is also mounted on the other arm 51 of cantilever element 50.

It will be appreciated from FIG. 5 that the provision of the upright frame member 40 and its manner of construction provides a very simple arrangement for mounting the various operating components other than the vibrator 30 of the unit. In particular, it will be seen that the two electric drive motors 75 and 140 for the agitator and reset mechanisms respectively as well as their associated gearboxes are mounted on opposite sides respectively of the housing 47. The agitator and reset mechanisms are disposed on opposite sides respectively of the side elements 43, 48 and 44, 49 of the upright frame member and the support bracket and cantilever beam is mounted on the longitudinal axis of the frame member 40 in the housing 47 between the two drive motors.

The operation of the unit is controlled by the electronic control circuit 18 illustrated in FIG. 12, which also shows the various operating components connected to the circuit 18. In particular the control circuit 18 controls, the counters 109, 110, agitator and reset motors, 75 and 140, the lamps 148, 149, for the push buttons 16, 17, and vibrator 30 according to the information received from the push button switches 16a, 17a, load cell 101, weight adjustment digital switches 107 and 108 and platform and reset microswitches 94 and 97. Behind the rear panel of the casing 1, there are three control knobs (not shown) two of which are connected respectively to two, slow and fast speed, potentiometers 150 and 151 for setting the speed of vibration of the vibrator 30 and thus the rate of feed of food onto the weighing platform through a VIBRATOR SPEED CONTROLLER in the control circuit 18 and a third knob of which is connected to a speed changeover potentiometer 152 by means of which the position in time when the vibrator feed rate is changed, e.g. from relatively fast to relatively slow rate can be changed through the VIBRATOR SPEED CONTROLLER. As can be seen in FIG. 1 the push buttons 16 and 17 for the light and heavier weighs respectively have the letters R and L respectively thereon which convey to the operator the meaning of a regular (light) and large (heavy) weigh. The connections of the mains indicating light 14 and master switch 15 to the control circuit are not shown but it should be appreciated that when the unit is plugged into the mains, the light 14 comes on, the heating device 7, if provided is switched on, the switch 15 is illuminated and the control circuit 118 including load cell 101 is energized but the vibrator 30 and agitator and reset motors 75 and 140 are not operated until the switch 15 is switched to its other position in which its light is switched off.

The main sections of the unit function as follows.

(1) The vibrator 30 is a solenoid feed with half-waves pulses which moves the food by virtue of its motion. The amplitude of vibration, and hence the feed speed is controlled by the VIBRATOR SPEED CONTROLLER which has two control inputs "FAST/SLOW" and "VIBRATOR STOP". With VIBRATOR STOP "high", i.e. at a logical 1, no power is applied to the vibrator 30. With VIBRATOR STOP "low", power is applied to the vibrator according to the state of FAST/SLOW. When this input is high, the amplitude of vibration is controlled by the FAST potentiometer 151 and when low is controlled by the SLOW potentiometer 150.

(2) The RESET CONTROL CIRCUIT is responsible for initializing all the logic and weighing circuits of the control circuit 18 at the beginning of each feed, controlling the platform reset motor 140 and incrementing the portion counters 109, 110 after each portion has been dispensed. The RESET CONTROL CIRCUIT is controlled by the platform microswitch 94 which detects the platform releasing and the reset microswitch 97 which detects the completion of a reset motor cycle.

(3) The AGITATOR CONTROL CIRCUIT runs the agitator motor 75 only when the vibrator 30 is running. At all other times, the motor 75 is off. Control signals for this circuit are derived from the Reset Control and Weighing Circuits.

(4) The load cell is a thin film cantilever beam strain gauge, which is designated by the reference 101 in FIGS. 5 and 7 and for convenience by the same reference in FIG. 12, wired into a Wheatstone Bridge configuration. It supplies a minute electrical signal proportional to the amount of deflection produced by the weight on the weighing platform 32. This signal is amplified by the commutating Auto Zero Amplifier (CAZAMP) to a useful level for the Analogue to Digital Converter (A to D) which is connected in a ratio metric configuration to reject supply variation.

(5) The Weight Comparison Circuits and Logic circuits of the Control Circuit 18 form the rest of the block diagram. These circuits first detect that the weight on the platform 32 has reached a percentage of the predetermined weight, set by the FOUR DECADE COUNTER by means of the digital switches 107, 108, to reduce the speed of the vibrator 30 from the initial fast setting to the slow setting, and then detect that the predetermined weight has been reached to stop the feed. Finally, the Logic circuit decides whether to dispense a portion immediately, as set by the regular portion digital switches 107, when the Regular push button 16 is pressed, or whether to feed on more food for the weight set by the large portion digital switches 108 and then dispense, when the Large push button 17 is pressed. According to which portion size has been selected, the Logic Circuit signals the RESET CONTROL CIRCUIT which of the two counters 109, 110 should be incremented at the end of a vending cycle.

A vending cycle consisting of weighing and dispensing cycles will now be described with reference to FIG. 12 which in the drawing shows the state of switches 15, 94 and 97, with the switch 15 in its open position in which it will be illuminated when power is supplied to the unit, with switch 94 closed and with switch 97 open. When the unit is switched on at the mains with the weighing platform 32 in its released position and the switch 15 is closed, the magnet 98 is energized and due to platform microswitch 94 being closed, the reset motor 140 starts, thus closing reset microswitch 97, rotating the disc 134 which moves the telescopic arm 125 and thus the link arm 123. However, due to the lost motion device, there is no movement of the reset lever 120 until the boss 126 engages with the upper side of the fixed arm 127 whereupon the roller 121 moves along the under-surface of the platform arm 99 and lifts the lower end of the reset lever to the left, into the chain line position illustrated in FIG. 2, the movement of the reset lever closing reset microswitch 97 and hinging the weighing platform 32 upwards and into its substantially horizontal food receiving position. As the platform closes, the plate 100 on the platform arm 99 engages the magnet 98 which retains the platform in place and the platform microswitch 94 opens. The reset motor continues to run until the reset lever roller 121 disengages the platform arm and the reset motor continues running until the reset lever is returned to its original rest position when the reset microswitch 97 is opened. At this point, with reset microswitch 97 and platform microswitch 94 open, the reset motor 140 is switched off and the RESET CONTROL CIRCUIT waits until the A to D converter has indicated a stable state and the mechanics have settled. The FOUR DECADE COUNTER is then reset and the vibrator 30 and agitator motor 75 are started by the Reset and Weighing Circuit, and the vibrator 30 feeds food onto the weighing platform 32, initially at a fast speed.

It will be appreciated that the disc 134 turns through 360° in each reset cycle and that is has turned through approximately 180° at the point where the platform is closed.

The lost motion device constituted by the link arm 123 boss 126 and fixed arm 124 ensures that any further rotation of the reset motor before it is braked does not disengage the reset lever from the reset microswitch 97 which would prevent the vibrator 30 and agitator motor 75 from starting and restart the reset motor 140 out of sequence so that the vending cycle would not begin. If, during resetting, the weighing platform should happen to be prevented from reaching its substantially horizontal position in which it is held by the magnetic latch, or jammed e.g. by a hard chip getting in its way, with consequential non-opening of the platform microswitch, then the telescopic arm 125 can lengthen thereby enabling the reset motor 140 to continue to rotate so that the platform can hinge downwards. Since the platform microswitch 94 is closed in such cases, the vibrator 30 will not be started by the reset lever 120 opening the reset microswitch 97 but the reset motor 140 will continue to run to try and reset until the jam has cleared. The provision of the telescopic arm or an equivalent thereto renders the unit completely safe since even if an operator's hand is placed into the dispensing chamber through the top of the dispensing chamber by removing the grill 9, in an attempt to release any jam, if a finger is caught between the platform 32 and the wall of the dispensing chamber 31 there will not be any damage to the operator's hand. Moreover, the weighing platform can be easily released for cleaning purposes from the top of the dispensing chamber merely by pressing against the resilience of the spring 93 and removing the hinge pins 80, 81 through the holes in the chamber walls.

The weight set by the Regular portion digital switches 107, 108 is continuously sampled, de-multiplexed and latched as is the digital representation of the load cell signal. The two signals are continuously compared in a Magnitude Comparator (MAG COMP) and also an approximate analogue representation of each signal is derived and compared. When the analogue value of weight is equal to the percentage of the predetermined weight set by the speed changeover potentiometer 152, and sensed by the load cell 101, the VIBRATOR SPEED CONTROLLER is signalled to switch to slow speed, so that the vibrator 30 then operates at the slow speed set by slow potentiometer 150. When the digital comparison indicates that the predetermined weight has been reached, sensed by the load cell 101, and is steady for a time determined by the MONOSTABLE, a "READY" signal stops the vibrator 30 and agitator motor 75 and illuminates the "Regular" lamp 148 to indicate that a weighed portion of food is available, the control circuit 18 thus providing a condition in which the weighing platform can be released. If a Regular portion is required, the Regular push button 16 is pressed, the control circuit sends a signal to the magnet 98 which is momentarily de-energized, releasing the platform which hinges downwardly to dispense the weighed portion of food through the spout 11. The platform microswitch 94 is closed and the Regular counter 109 is pulsed. After a time delay, detected by the platform microswitch 94 being closed, the magnet 98 is energized and the reset motor 140 is started.

If a large portion is required, the "Large" push button 17 is pressed instead of the Regular push button 16 when the latter lights up, whereupon the LARGE SELECT BISTABLE changes state causing the "Regular" lamp 148 to go out and the "Large" push button lamp 149 to light up and the LARGE SELECT BISTABLE selects the pair of digital switches 108 for a large portion. As the predetermined weight has now become higher than the measured weight, the vibrator 30 and agitator motor 75 start again, with the vibrator feed speed being controlled by the same conditions as before. When the higher predetermined weight is reached, the "READY" signal is now used to de-energize the magnet 98, releasing the platform 32 and thus dispensing the heavier weighed portion of food. The "READY" signal and then the releasing of the platform with closure of the platform microswitch 94 once again stop the vibrator and agitator motor completely. With microswitch 94 closed the RESET CONTROL CIRCUIT once again initiates a reset cycle and increments, this time, the "Large" portion counter 110 according to the state of the LARGE SELECT BISTABLE and after the reset cycle is complete vibrator feed and thus the next vending cycle begins. When the Large push button is pressed, the unit passes through dispensing and reset and to recommencement of the next vending cycle.

The unit described is suitable for the vending of flowable solid foods of finely divided form such as food powders or sugar, of particulate form, such as rice, noodles, popcorn or nuts and in the form of relatively small discrete particles or pieces such as chips/french fries, crisps, steak segments, scampi, prawns or meat balls. The unit according to the invention is not suitable nor intended for weighing and dispensing liquids. Although primarily designed for weighing and dispensing cooked foods, for keeping cooked foods hot and draining away cooking oil or fat, the heating device and drainage system need not be included and the vibrator tray need not be inclined as described but may be horizontal. For example in some fast food catering establishments the hot cooked food delivered to the receptacle is vended so quickly that there is no significant cooling of the food before dispensing and some cooked food may not have any excess oil or fat to be drained away e.g. predrained chips/french fries. With some foods such as nuts and popcorn for example, heating and drainage may be totally unnecessary.

Various modifications may be made without departing from the scope of the invention as defined in the appended claims. For example, instead of using springy metal strips for the cantilever arms, rigid arms which are pivoted at one of their ends to the upright frame member and are pivoted at the other ends to the weighing frame may be used, or, alternatively, again, a parallelogram system of knife-edges may be used to support the weighing frame from the upright frame member. Instead of the magnetic latch, the platform arm may be provided with the aperture which engages with a hook type latch member pivoted to and projecting through an aperture in the weighing frame arm. The pivot for the latch member is disposed intermediate its ends and the upper part of the latch member is engaged by the armature of a solenoid which is either energised or de-energised by the control circuit to hold the latch member and thus the weighing platform in the latched position or to release the latch member to release the weighing platform.

Instead of the telescopic arm, a two part arm of which the two parts are joined together by a friction element which normally maintains the length of the arm but when the platform jams the friction is overcome causing the arm to vary its length or, alternatively, the arm may be in the form of a stiff tension spring.

Instead of being arranged to hinge downwardly, the weighing platform may hinge upwardly in which case the hinge pins are disposed nearer the front edge of the weighing platform. The invention also embraces other methods of mounting the platform and discharge but hinging is preferred since immediately the platform is released discharge occurs simultaneously.

The external spout 11 which is removable may not be necessary in some instances.

The receptacle 5 may be omitted and the dispensing chamber be associated with a conveyorized food feed system which would be controlled by the control circuit 18.

It will be appreciated that the electronic control circuit described and illustrated is only given by way of example and that other suitable control circuits may be used which would be apparent to those skilled in the art.

For example, an electrical control circuit without electronic components and utilizing relays for example may be used instead of the described control circuit. The digital weight setting switches 107, 108, may be replaced by suitable analogue switches, for example two potentiometers. Instead of being disposed within, the casing 1, the control circuit may be arranged on a board or box which can be simply plugged in from the outside of the casing.

We claim:

1. A unit for weighing and dispensing portions of flowable solid food of predetermined weight, in which food is fed into a dispensing chamber and onto a weighing platform supported by a movable weighing support, said unit comprising means for sensing a predetermined weight of food on said platform, means for retaining the platform in a position to receive the food, a control circuit for setting the predetermined weight and being operable by a signal from said sensing means to provide a condition in which feed is stopped and the retaining means can release the platform to permit it to move into a position in which a weighed portion of food can be discharged therefrom, means for resetting the weighing platform automatically to its food receiving position after discharge of a weighed portion of food, and electrical drive means connected to said control circuit for driving said reset means, and means for enabling the electrical drive means to continue to operate if the weighing platform should initially be prevented from being reset to its food receiving position by any solid food obstruction, whereby to enable the weighing platform to be continually moved by the continued operation of the drive means and reset means to clear said solid food obstruction and thereafter enable the weighing platform to be reset.

2. A unit as claimed in claim 1, characterised in that the retaining means includes a first latching arm which is rigid with the weighing support and projects forwardly therefrom on one side of the dispensing chamber, and a second latching arm carried by the weighing platform outside the dispensing chamber and which cooperates with the first latching arm to retain the platform in its food receiving position, and in that the second latching arm is releasable from the first latching arm by means of the releasing signal from the control circuit.

3. A unit as claimed in claim 2, characterised in that the first latching arm carries an electromagnet energized by the control circuit to engage with a magnetic part of the second latching arm, said electromagnet being momentarily de-energized by said releasing signal to release the second latching arm.

4. A unit as claimed in claim 1, characterised in that the weighing support is a parallelogram weighing support which is supported by parallelogram arms which project rearwardly therefrom and are secured at their opposite end regions to the weighing support and to a stationary support member respectively, said sensing means being separate from said arms, and in that the parallelogram arms have a degree of resilience to permit downward weighing movement of the weighing support.

5. A unit as claimed in claim 4, characterised in that the parallelogram arms are constituted by resilient strips which bear on the support member for a sufficient portion of their lengths to stabilise the weighing support in its weighing position even if a lateral thrust is applied thereto, and in that the weighing platform is supported, at opposite sides thereof, on the weighing support by hinge means which pass through respective apertures in the side walls of the dispensing chamber to permit hinging movement of the platform about a substantially horizontal axis, said platform being held in position by resilient means connected to the weighing platform and exerting a resilient pressure along said substantially horizontal axis, and in that the weighing platform can be disconnected from the weighing support by applying a lateral thrust to the platform against the pressure of the resilient means and be removed from the dispensing chamber for cleaning.

6. A unit as claimed in claim 4, characterised in that the retaining means are released by a signal from said control circuit to release the weighing platform, means are provided for resetting the weighing platform automatically after discharge of a weighed portion of food, the weighing support is in the form of a generally vertically disposed open frame disposed outside the dispensing chamber and having a bottom element extending transversely of the unit adjacent the rear wall of the dispensing chamber, and side elements of which upper end portions are disposed adjacent opposite side walls respectively of the dispensing chamber and support the weighing platform, the majority of the weight of the weighing support is supported by parallelogram arms which are secured to a unitary upright support member, the sensing means is incorporated in at least one weigh beam which is cantilevered from the upright support member and is connected in the region of its free outer end to an elongate suspension element which is connected to the weighing support to support the remainder of the weight of the weighing support, the reset means comprises a lever system driven by an electric motor connected to the control circuit, including a reset lever pivotted at its upper end for movement about a substantially horizontal pivot axis and carrying at its lower end a roller which cooperates with a latching arm fixed to the weighing platform outside the dispensing chamber, the lever system including a lost motion device comprising an arm fixed to the upper end of the reset lever at an angle thereto, a link arm mounted at one end for pivotal movement about the same substantially horizontal axis, and a projection on the link arm disposed above and spaced from the arm fixed to the reset lever, the projection engaging with said fixed arm only after a predetermined amount of rotation of the motor, and the link arm being pivotted at its other end to the upper end of a connecting arm which at its lower end is connected eccentrically to a drive disc fast for rotation with the drive motor, the connecting arm being a telescopic spring-loaded arm which is capable of varying its length, at least one predetermined weight is set by at least one respective switching means connected to weight setting means in the control circuit, at least one counter is provided for counting the weighed portions of food and is connected to the control circuit such that operation of the reset means increments said at least one counter, separate adjustable end stop means are associated with the at least one weigh beam and with the weighing support and said upright support member, and in that a unitary base support member is provided which supports a vibrator for feeding food to the dispensing chamber and connected to the control circuit, the unitary upright support member being secured to a front portion of the base member and supporting the weighing support, an agitator for the food being fed is provided which is driven by an electric motor and connecting mechanism, the agitator motor and mechanism being supported on the upright frame member at one side thereof and being connected to the control circuit such that the vibrator and agitator motor are always switched on and switched off together by the control circuit, the reset motor and associated lever system being supported on the upright support member on the other side thereof and the sensing means being supported on the upright support member between the agitator and reset motors.

7. A unit as claimed in claim 1, characterised in that the reset means comprises a lever system and in that the electrical drive means is an electric motor which drives the lever system.

8. A unit as claimed in claim 7, characterized in that the weighing support carries a first switching means connected to the control circuit for providing the latter with a platform position signal and in that a second switching means is connected to the control circuit for actuation by the reset means, whereby when both switching means are made, feed to the weighing platform is initiated by means of a signal from the control circuit.

9. A unit as claimed in claim 8, characterised in that the lever system comprises a reset lever which is arranged to cooperate with a latching arm on the weighing platform and a lost motion device for ensuring that the second switching means stays made after a reset cycle and before the reset motor is stopped by a signal from the control circuit.

10. A unit as claimed in claim 7, characterised in that the lever system includes a connecting arm to the drive motor, said connecting arm constituting the means for enabling the electrical drive means to continue to operate by being capable of varying its length.

11. A unit as claimed in claim 1, characterised in that the control circuit is connected to a switch which is operated from the outside of the unit and in that an indicating light which is normally off is associated with said switch and is connected to the control circuit, whereby when the control circuit provides said condition, said light is switched on by the control circuit to provide a visual indication that a weighed portion of food is ready to be dispensed, said switch being operable to cause said control circuit to transmit a releasing signal to said retaining means to release the weighing platform.

12. A unit as claimed in claim 11, characterised in that the control circuit is connected to a second switch which is operated from the outside of the unit, for a predetermined heavier weight of food than that dispensed by the operation of the first mentioned switch operated from the outside of the unit, and in that a second indicating light which is normally off is connected to said second switch whereby, when the second switch is operated after the indicating light for the first mentioned switch is switched on, the second indicating light is switched on to provide a visual indication that the said predetermined heavier weight of food has been selected and the control circuit is caused by the operation of the second switch to initiate a signal to restart feed which continues until the sensing means detects the predetermined heavier weight, whereupon the control circuit stops feed and transmits a releasing signal to the retaining means to release the weighing platform.

13. A unit as claimed in claim 1, and characterised by means mounting said reset means separately from and without any connection to said retaining means, said weighing platform and said weighing support, said retaining means comprising co-operating latching parts on the weighing platform and weighing support and said reset means including means which engages with the latching part on the platform to reset the latter to its food receiving position, and which when the weighing platform is reset disengages from said platform latching part.

14. A unit as claimed in claim 1, characterised in that the weighing support is a parallelogram weighing support which is supported by parallelogram arms which project rearwardly therefrom and are secured at their opposite end regions to the weighing support and to a stationary support member respectively, said sensing means being incorporated in at least one of said arms, and in that the parallelogram arms have a degree of resilience to permit downward weighing movement of the weighing support.

15. A unit as claimed in claim 14, characterised in that the parallelogram arms are constituted by resilient strips which bear on the support member for a sufficient portion of their lengths to stabilise the weighing support in its weighing position even if a lateral thrust is applied thereto, and in that the weighing platform is supported, at opposite sides thereof, on the weighing support by hinge means which pass through respective apertures in the side walls of the dispensing chamber to permit hinging movement of the platform about a substantially horizontal axis, said platform being held in position by resilient means connected to the weighing platform and exerting a resilient pressure along said substantially horizontal axis, and in that the weighing platform can be disconnected from the weighing support by applying a lateral thrust to the platform against the pressure of the resilient means and be removed from the dispensing chamber for cleaning.

16. A unit for weighing and dispensing portions of flowable solid food of predetermined weight, in which food is fed into a dispensing chamber and onto a weighing platform supported by a movable weighing support, said unit comprising means for sensing a predetermined weight of food on said platform, releasable retaining means for retaining the platform in a position to receive the food, said retaining means including a first latching arm which is rigid with the weighing support and projects forwardly therefrom on one side of the dispensing chamber and a second latching arm carried by the weighing platform outside the dispensing chamber and which cooperates with the first latching arm to retain the platform in its food receiving position, and a control circuit for setting the predetermined weight and being operable by a signal from said sensing means to provide a condition in which feed is stopped and the retaining means can release the platform to permit it to move into a position in which a weighed portion of food can be discharged therefrom, and in that the second latching arm is releasable from the first latching arm by means of a signal from said control circuit to release the weighing platform.

17. A unit as claimed in claim 16, characterised in that the first latching arm carries an electromagnet energised by the control circuit to engage with a magnetic part of the second latching arm, said electromagnet being momentarily de-energised by said releasing signal to release the second latching arm.

18. A unit for weighing and dispensing portions of flowable solid food of predetermined weight, in which food is fed into a dispensing chamber and onto a weighing platform supported by a movable weighing support, said weighing support being a parallelogram weighing support which is supported by parallelogram arms which project rearwardly therefrom and are secured at their opposite end regions to the weighing support and to a stationary support member respectively, said sensing means being separate from said arms, the parallelogram arms having a degree of resilience to permit downward weighing movement of the weighing support, there being means for sensing a predetermined weight of food on said platform, releasable means for retaining the platform in a position to receive the food and a control circuit for setting the predetermined weight and being operable by a signal from said sensing means to provide a condition in which feed is stopped and the retaining means can release the platform to permit it to move into a position in which a weighed portion of food can be discharged therefrom.

19. A unit as claimed in claim 18, wherein the parallelogram arms are constituted by resilient strips which bear on the support member for a sufficient portion of their lengths to stabilise the weighing support in its weighing position even if a lateral thrust is applied thereto, the weighing platform being supported, at opposite sides thereof, on the weighing support by hinge means which pass through respective apertures in the side walls of the dispensing chamber to permit hinging movement of the platform about a substantially horizontal axis, said platform being held in position by resilient means connected to the weighing platform and exerting a resilient pressure along said substantially horizontal axis, whereby the weighing platform can be disconnected from the weighing support by applying a lateral thrust to the platform against the pressure of the resilient means and be removed from the dispensing chamber for cleaning.

20. A unit for weighing and dispensing portions of flowable solid food of predetermined weight, in which food is fed into a dispensing chamber and onto a weighing platform supported by a movable weighing support, said weighing support being a parallelogram weighing support which is supported by parallelogram arms which project rearwardly therefrom and are secured to their opposite end regions to the weighing support and to a stationary support member respectively, said sensing means being incorporated in at least one of said arms and the parallelogram arms having a degree of resilience to permit downward weighing movement of the weighing support, there being means for sensing a predetermind weight of food on said platform, releasable means for retaining the platform in a position to receive the food and a control circuit for setting the predetermined weight and being operable by a signal from said sensing means to provide a condition in which feed is stopped and the retaining means can release the platform to permit it to move into a position in which a weighed portion of food can be discharged therefrom.

21. A unit as claimed in claim 20, wherein the parallelogram arms are constituted by resilient strips which bear on the support member for a sufficient portion of their lengths to stabilise the weighing support in its weighing position even if a lateral thrust is applied thereto, the weighing platform being supported, at opposite sides thereof, on the weighing support by hinge means which pass through respective apertures in the side walls of the dispensing chamber to permit hinging movement of the platform about a substantially horizontal axis, said platform being held in position by resilient means connected to the weighing platform and exerting a resilient pressure along said substantially horizontal axis, whereby the weighing platform can be disconnected from the weighing support by applying a lateral thrust to the platform against the pressure of the resilient means and be removed from the dispensing chamber for cleaning.

22. A unit for weighing and dispensing portions of flowable solid food of predetermined weight, in which food is fed to a dispensing chamber and onto a weighing platform supported by a movable weighing support, said unit comprising means for sensing a predetermined weight of food on said platform, releasable means for retaining the platform in a position to receive the food, a control circuit for setting the predetermined weight and being operable by a signal from said sensing means to provide a condition in which feed is stopped and the retaining means can release the platform to permit it to move into a position in which a weighed portion of food can be discharged therefrom, and means for resetting the weighing platform automatically after the discharge of a weighed portion of food, said reset means comprising a lever system driven by an electric motor connected to the control circuit.

23. A unit as claimed in claim 22, wherein the electric motor comprises a brake which is operated when the electric motor is switched off after the weighing platform has been reset to its food receiving position.

24. A unit as claimed in claim 22, wherein the weighing support carries a first switching means connected to the control circuit for providing the latter with a platform position signal and wherein a second switching means is connected to the control circuit for actuation by the reset means, whereby when both switching means are made, feed to the weighing platform is initiated by means of a signal from the control circuit.

25. A unit as claimed in claim 24, wherein the lever system comprises a reset lever which is arranged to cooperate with a latching arm on the weighing platform and a lost motion device for ensuring that the second switching means stays made after a reset cycle and before the reset motor is stopped by a signal from the control circuit.

26. A unit as claimed in claim 25, wherein the lost motion device comprises an arm fixed to the upper end of the reset lever at an angle thereto, a link arm mounted at one end for pivotal movement about the same substantially horizontal axis, and a projection on the link arm disposed above and spaced from the arm fixed to the reset lever, the projection engaging with said fixed arm only after a predetermined amount of rotation of the motor.

27. A unit as claimed in claim 26, wherein the link arm is pivotted at its upper end to the upper end of a connecting arm which at its lower end is connected eccentrically to a drive disc fast for rotation with the drive motor, the connecting arm being a telescopic spring-loaded arm which is capable of varying its length.

28. A unit as claimed in claim 22, wherein the lever system includes a connecting arm to the drive motor, said connecting arm being capable of varying its length to permit the reset motor to continue to operate if the weighing platform should be prevented from being reset to its food receiving position.

29. A unit for weighing and dispensing portions of flowable solid food of predetermined weight, in which food is fed into a dispensing chamber and onto a weighing platform supported by a movable parallelogram weighing support, there being means for sensing a predetermined weight of food on said platform, releasable means for retaining the platform in a position to receive the food and a control circuit for setting the predetermined weight and being operable by a signal from said sensing means to provide a condition in which feed is stopped and the retaining means can release the platform to permit it to move into a position in which a weighed portion of food can be discharged therefrom, and wherein the retaining means are released by a signal from said control circuit to release the weighing platform, means are provided for resetting the weighing platform automatically after discharge of a weighed portion of food, the weighing support is in the form of a generally vertically disposed open frame disposed outside the dispensing chamber and having a bottom element extending transversely of the unit adjacent the rear wall of the dispensing chamber, and side elements of which upper end portions are disposed adjacent opposite side walls respectively of the dispensing chamber and support the weighing platform, the majority of the weight of the weighing support is supported by parallelogram arms which are secured to a unitary upright support member, the sensing means is incorporated in at least one weight beam which is cantilevered from the upright support member and is connected in the region of its free outer end to an elongate suspension element which is connected to the weighing support to support the remainder of the weight of the weighing support, the reset means comprises a lever system driven by an electric motor connected to the control circuit, including a reset lever pivotted at its upper end for movement about a substantially horizontal pivot axis and carrying at its lower end a roller which cooperates with a latching arm fixed to the weighing platform outside the dispensing chamber, the lever system including a lost motion device comprising an arm fixed to the upper end of the reset lever at an angle thereto, a link arm mounted at one end for pivotal movement about the same substantially horizontal axis, and a projection on the link arm disposed above and spaced from the arm fixed to the reset lever, the projection engaging with said fixed arm only after a predetermined amount of rotation of the motor, and the link arm being pivotted at its other end to the upper end of a connecting arm which at its lower end is connected eccentrically to a drive disc fast for rotation with the drive motor, the connecting arm being a telescopic spring-loaded arm which is capable of varying its length, at least one predetermined weight is set by at least one respective switching means connected to weight setting means in the control circuit, at least one counter is provided for counting the weighed portions of food and is connected to the control circuit such that operation of the reset means increments said at least one counter, separate adjustable end stop means are associated with the at least one weigh beam and with the weighing support and said upright support member, and in that a unitary base support member is provided which supports a vibrator for feeding food to the dispensing chamber and connected to the conical circuit, the unitary upright support member being secured to a front portion of the base member and supporting the weighing support, an agitator for the food being fed is provided which is driven by an electric motor and connecting mechanism, the agitator motor and mechanism being supported on the upright frame member at one side thereof and being connected to the control circuit such that the vibrator and agitator motor are always switched on and switched off together by the control circuit, the reset motor and associated lever system being supported on the upright support member on the other side thereof and the sensing means being supported on the upright support member between the agitator and reset motors.

30. A unit for weighing and dispensing portions of flowable solid food of predetermined weight, in which food is fed into a dispensing chamber and onto a weighing platform supported by a movable weighing support, said dispensing chamber, said weighing platform and said movable weighing support being disposed in a casing having a front panel behind which said dispensing chamber is arranged, said dispensing chamber having wall means defining an upper portion in which the weighing platform is disposed and a lower portion terminating in an outlet, the wall means of said lower portion being disposed at an angle to the wall means of said upper portion and converging towards one another whereby the lower portion is angled outwardly towards said front panel, said front panel having means defining an aperture therein which aligns with the outlet of the said lower portion of said dispensing chamber, and a discharge spout removably secured in said opening in said front panel and in said outlet, said unit further comprising means for sensing a predetermined weight of food on said platform, releasable means for retaining the platform in a position to receive the food and a control circuit for setting the predetermined weight and being operable by a signal from said sensing means to provide a condition in which feed is stopped and the retaining means can release the platform to permit it to move into a position in which a weighed portion of food can be discharged therefrom into said dispensing chamber lower portion and out through the front of said unit through said outlet and said aperture to said dispensing spout.

* * * * *